H. C. GUTTRIDGE.
HORSE COLLAR.
APPLICATION FILED JULY 23, 1912.
1,085,253.
Patented Jan. 27, 1914.
2 SHEETS—SHEET 1.
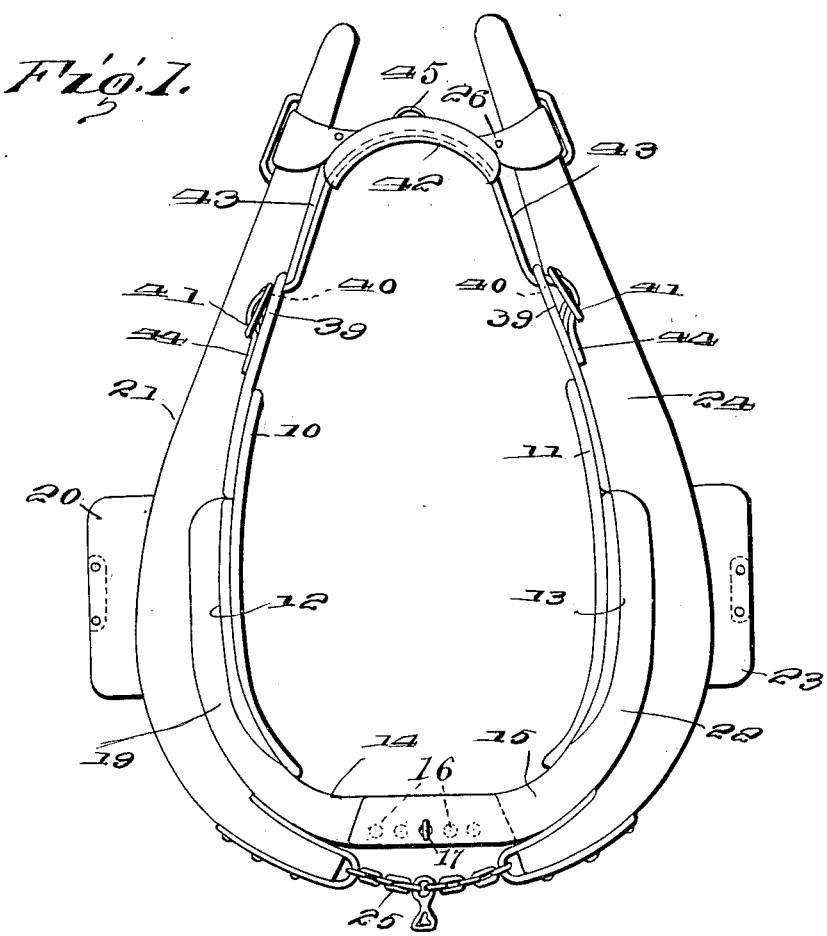
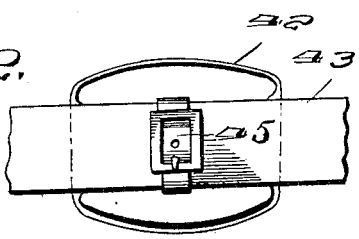
Inventor
H. C. Guttridge.
Witnesses
By
Attorneys.

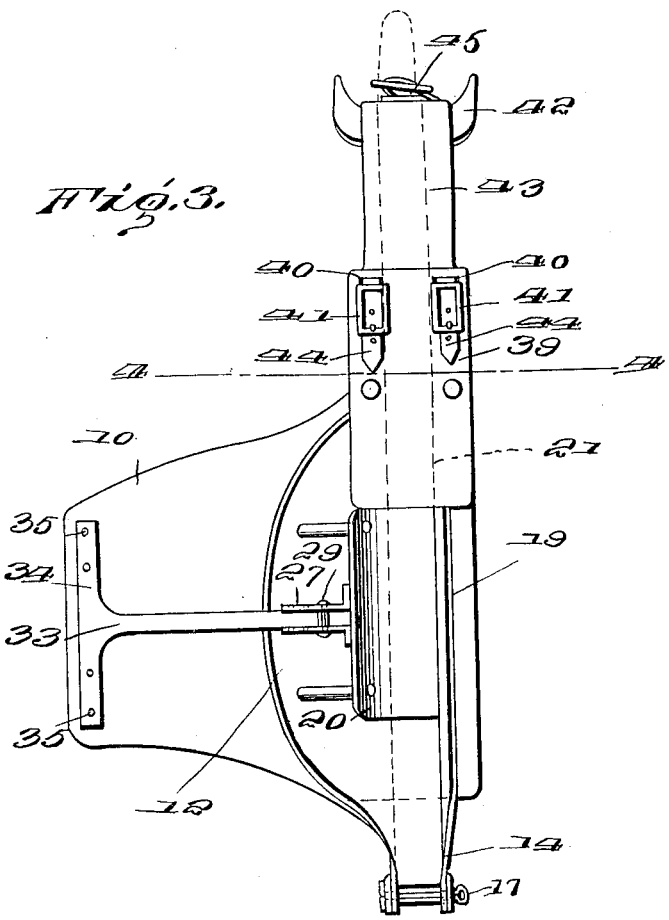
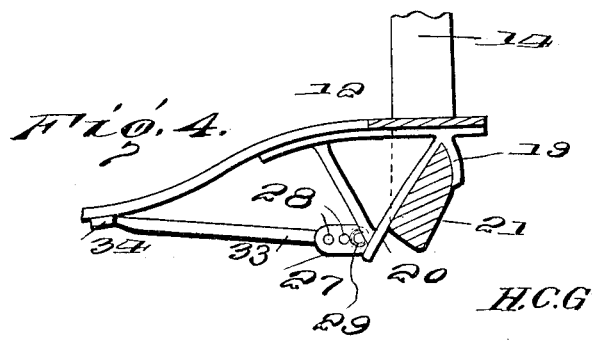

UNITED STATES PATENT OFFICE.

HOMER C. GUTTRIDGE, OF CULLISON, KANSAS.

HORSE-COLLAR.

1,085,253.

Specification of Letters Patent.   Patented Jan. 27, 1914.

Application filed July 23, 1912.   Serial No. 711,130.

*To all whom it may concern:*

Be it known that I, HOMER C. GUTTRIDGE, citizen of the United States, residing at Cullison, in the county of Pratt and State of Kansas, have invented certain new and useful Improvements in Horse-Collars, of which the following is a specification.

This invention relates to improvements in horse collars, and has for one of its objects to provide a simply constructed device which may be readily adjusted to fit the necks and shoulders of horses of various sizes and forms and which is arranged to bear upon the neck and shoulders of the horse only at the points where the pressure is to be applied.

Another object of the invention is to provide a simply constructed device which may be readily adapted to the hames already in use and to replace the ordinary horse collar without material structural change in the harness.

Another object of the invention is to provide a horse collar which is light in structure, durable, and which obviates the cumbersome cushioned or filled members ordinarily employed.

With these and other objects in view, the invention consists in certain novel features of construction as hereafter shown and described, and then specifically pointed out in the claims, and in the drawings illustrative of the preferred embodiment of the invention.

Figure 1 is a front elevation of the improved collar with the hames applied; Fig. 2 is a plan view of the upper member of the improved collar; Fig. 3 is a side elevation with one of the hames in dotted lines; Fig. 4 is a section on the line 4—4 of Fig. 3.

Corresponding and like parts are referred to in the following description and indicated in all the views of the drawings by the same reference characters.

The improved collar embraces side-bearing members for engaging against the sides of the shoulders of the horse, a neck-engaging portion for bearing upon the neck of the horse and supporting the side portions, and coupling means between the side portions beneath the throat of the horse, the side portions being adapted to support the hames. The side portions of the improved collar comprise flexible members 10—11, formed preferably of relatively soft leather or the like, and preferably converging toward the rear ends. The members 10—11 readily adapt themselves to the configuration of the shoulder portion of the horse and thus receive the pulling strains. At its forward end the member 10 is riveted or otherwise secured to a plate 12, while a similar plate 13 is riveted or otherwise secured to the member 11 at its forward edge. At its lower end the plate 12 is extended into a channeled projection 14, while the plate 13 is extended at its lower end into a similar laterally extending channeled extension 15 which telescopically engages the extension 14. The extension 14 is provided with a plurality of apertures 16, while the extension 15 is provided with a single aperture, the apertures of the extension 15 being designed to register one at a time with the apertures of the extension 14 so that a holding pin 17 may be inserted through the registering apertures and thus adjustably lock the members 14—15 in position. One wall of the extension 14 is extended upwardly into a guard rib 19, and extending from the plate 12, is an opposing guard member 20, the latter being wider than the guard 19. The rib 19 is inclined forwardly, while the member 20 is inclined rearwardly thus producing a V-shaped recess or cavity in which one of the side members 21 of the hames is supported. The inner wall 15 of the other channel member is extended upwardly in the form of a rib 22 corresponding to the rib 19, while the plate 13 is provided with an extension member 23 corresponding to the member 20. The member 22 is inclined outwardly and forwardly, while the member 23 is inclined outwardly and rearwardly, thus producing a recess to receive the other hame member 24. As shown in Fig. 1, the lower inwardly curving portions of the hames extend beneath the channeled telescoping members 14—15 and are detachably coupled in the ordinary manner as indicated conventionally at 25, and coupled in the usual manner at their upper ends by a strap 26.

Extending rearwardly of the plate 20 are bracket members 27 spaced apart and provided respectively with registering apertures 28 to receive a holding pin 29, while similar bracket members extend from the plate 23 and are provided respectively with registering apertures to receive a similar pin. Connected to the member 10, at its rear edge, is an arm 33, the arm having a relatively long T-head or strap 34 which bears upon the member 10, and is secured thereto by rivets or other suitable fastening devices 35. By this means the arm 33 is rigidly coupled to the member 10 and extends forwardly between the bracket members 27 and is perforated to receive the pin 29. By this means it will be obvious that the member 33 may be adjusted by setting the pin 29 forwardly or backwardly in the apertures 28 of the brackets.

The member 11 is provided with a similar arm having a T-head secured to the member 11 by rivets or other fastening devices and engaging at its forward end between the bracket members by a similar pin. By this simple arrangement it will be obvious that the rear ends of the members 10—11 may be adjusted relative to the plates 12—13 and thus adapt the members 10—11 to variations in the shoulders of the horse.

Riveted or otherwise secured to the upper end of each of the members 10—11 is a member 39 preferably of leather or like material, and each provided with slots 40 spaced apart near its upper edge and with buckles 41 connected to the member 39 near the slots. At the upper end of the improved collar a neck plate 42 is disposed and provided with a relatively wide holding strap 43 which extends downwardly at each side of the plate and is provided with billet tongues 44 adapted to pass through the slots 40 and engage the buckles 41. By this means the neck plate is adjustably connected to the members 10—11 and supports the latter in position. The holding strap 43 is provided with a small strap 45 through which the coupling member 26 of the hames passes and is thereby held in position relative to the collar device.

It will thus be obvious that a simply constructed collar is produced which bears only upon the shoulder portions of the horse where the pulling strains occur and relieves the remaining portions of the neck and shoulders from pressure and likewise from contact with the collar. By this means all unnecessary friction and wear is obviated.

What I claim is:—

1. A horse collar comprising flexible pad members for engaging the shoulders of a horse, a rigid plate attached to each of said pad members at its forward part leaving the rear portion unsupported, means for coupling said plates at their lower ends, a member adapted to bear upon the neck of a horse, means for coupling said neck bearing members to said plates, hame-supporting members carried by said plates, and rigid coupling means between the hame-engaging members and the unsupported rear portions of the pads.

2. A horse collar comprising pad members for engaging the shoulders of a horse, a rigid bearing plate attached to each of said pad members, means for coupling said plates at their lower ends, a member adapted to bear upon the neck of a horse, means for coupling said neck bearing member to said plates, rearward and forward projections extending laterally from said plates and diverging to adapt them to receive hame members, an arm connected to each of said pad members, and means for adjustably coupling said arms respectively to the rearward projections, whereby the pads are adjustable to the shoulders of a horse.

3. A horse collar comprising pad members for engaging the shoulders of a horse, a rigid bearing plate attached to each of said pad members and extended at their lower ends with the extended portions slidably engaging each other, means operating to couple said slidably engaging portions, a member adapted to bear upon the neck of a horse, means for coupling said neck bearing member to said plates, and means adapted to support hames upon said plates.

4. A horse collar comprising flexible pad members for engaging against the shoulders of a horse, a rigid bearing plate attached to each pad member at the front leaving the rear portions unsupported, hame-supporting members carried by said plates, and rigid coupling means between the hame-engaging members and the unsupported rear portions of the pads.

5. A horse collar comprising flexible pad members for engaging against the shoulders of a horse, a rigid bearing plate attached to each pad member at the front leaving the rear portions unsupported, means adapted to engage over the neck of a horse, means for coupling said neck engaging means to said plates, hame-supporting members carried by said plates, a rigid arm connected to the unsupported portion of each of said pads, and means for adjustably coupling said rigid arms respectively to said hame-supporting members.

In testimony whereof I affix my signature in presence of two witnesses.

HOMER C. GUTTRIDGE. [L. S.]

Witnesses:
   MAUDE GUTTRIDGE,
   G. E. MARTIN.

---

Copies of this patent may be obtained for five cents each, by addressing the "Commissioner of Patents, Washington, D. C."